(12) United States Patent
McMillan

(10) Patent No.: US 9,706,718 B1
(45) Date of Patent: Jul. 18, 2017

(54) ROOT SOCKING PROCESS AND DISTRIBUTION

(71) Applicant: Vintage Nurseries, LLC, Los Angeles, CA (US)

(72) Inventor: Matthew McMillan, Visalia, CA (US)

(73) Assignee: VINTAGE NURSERIES, LLC, Los Angeles, CA (US)

( * ) Notice: Subject to any disclaimer, the term of this patent is extended or adjusted under 35 U.S.C. 154(b) by 59 days.

(21) Appl. No.: 14/496,974

(22) Filed: Sep. 25, 2014

(51) Int. Cl.
*A01G 1/00* (2006.01)
*B65B 5/04* (2006.01)
*B65B 5/08* (2006.01)

(52) U.S. Cl.
CPC .............. *A01G 1/001* (2013.01); *B65B 5/045* (2013.01); *B65B 5/08* (2013.01)

(58) Field of Classification Search
CPC ........ A01G 9/086; A01G 9/088; A01G 13/02; A01G 2013/0218; A01G 13/0237; A01G 13/0243; A01G 1/001; B65B 5/045; B65B 5/061; B65B 5/108
USPC ..... 47/32, 32.7, 32.8, 65, 65.8, 66.7, 73–78, 47/84, 48.5, 58.1 R, 58.1 SE
IPC ................ A01G 9/08,13/02; B65B 5/04, 5/08, B65B 5/10
See application file for complete search history.

(56) References Cited

U.S. PATENT DOCUMENTS

| | | | | |
|---|---|---|---|---|
| 3,550,662 A * | 12/1970 | Remke | ................. | A01G 23/043 383/107 |
| 4,055,974 A * | 11/1977 | Jackson, Jr. | ......... | C05G 3/0052 424/405 |
| 4,287,840 A * | 9/1981 | Weidner | ................. | A01G 23/04 111/101 |
| 5,331,908 A * | 7/1994 | Loeb | ........................ | A01G 7/00 111/114 |
| 5,363,592 A * | 11/1994 | Weder | ...................... | A01G 9/10 47/65.7 |
| 5,706,604 A * | 1/1998 | Yogi | ........................ | A01G 9/02 220/495.11 |
| 5,901,904 A * | 5/1999 | Avot | ...................... | B65B 5/108 229/109 |
| 5,943,818 A * | 8/1999 | Fruehwirth | .......... | A01G 31/045 47/17 |
| 2006/0150504 A1 * | 7/2006 | Kosderka | ........... | A01G 13/0243 47/73 |
| 2011/0041402 A1 * | 2/2011 | Teasdale | .............. | A01G 9/1026 47/59 S |
| 2011/0296755 A1 * | 12/2011 | Hawkinson | ........ | A01G 13/0268 47/65.8 |

* cited by examiner

Primary Examiner — Lisa Tsang
(74) Attorney, Agent, or Firm — Cotman IP Law Group, PLC

(57) ABSTRACT

A root socking process for efficient transplanting of vines and similar plants. Each plant is grown in its own plant-growing container followed by an automated process of covering the root mass or rootball of each plant with a sock, preferably biodegradable; filling a cardboard box with multiple root-socked plants; and stacking multiple cardboard boxes in pallets for transportation to the field. The plants are then transplanted in the field by picking up and dropping each root-socked plant from the cardboard box into a hole in the soil.

20 Claims, 13 Drawing Sheets

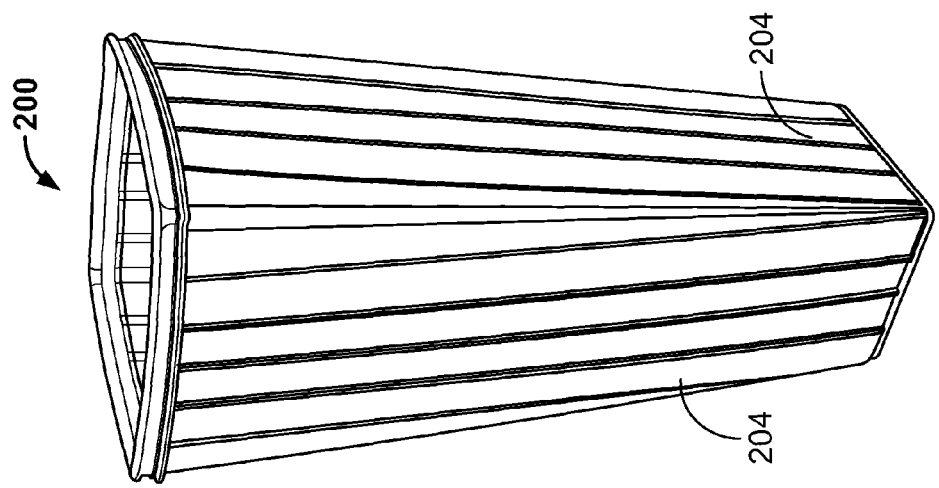
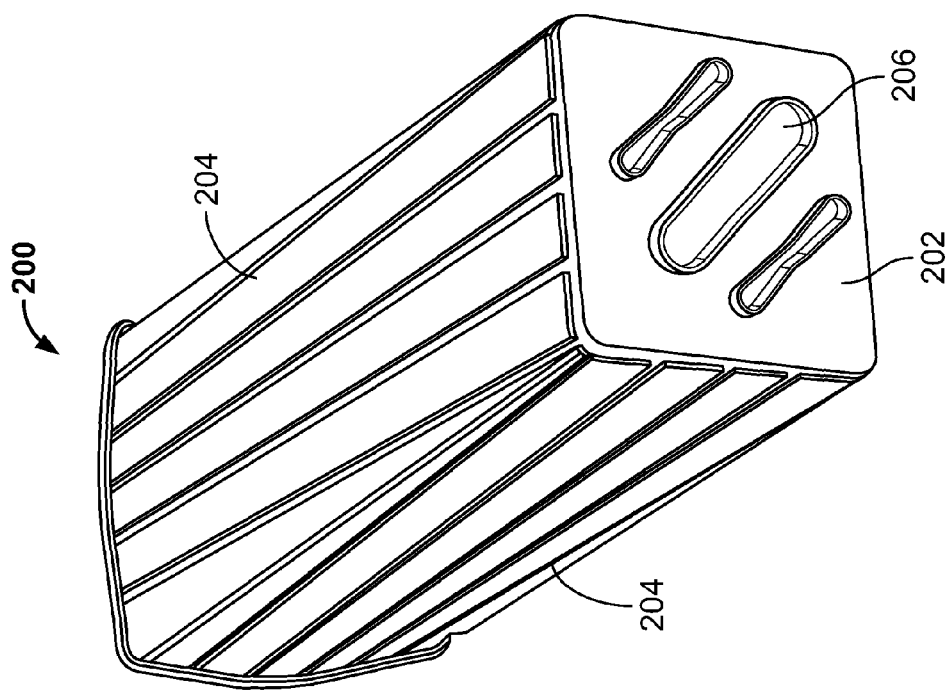
FIG. 2

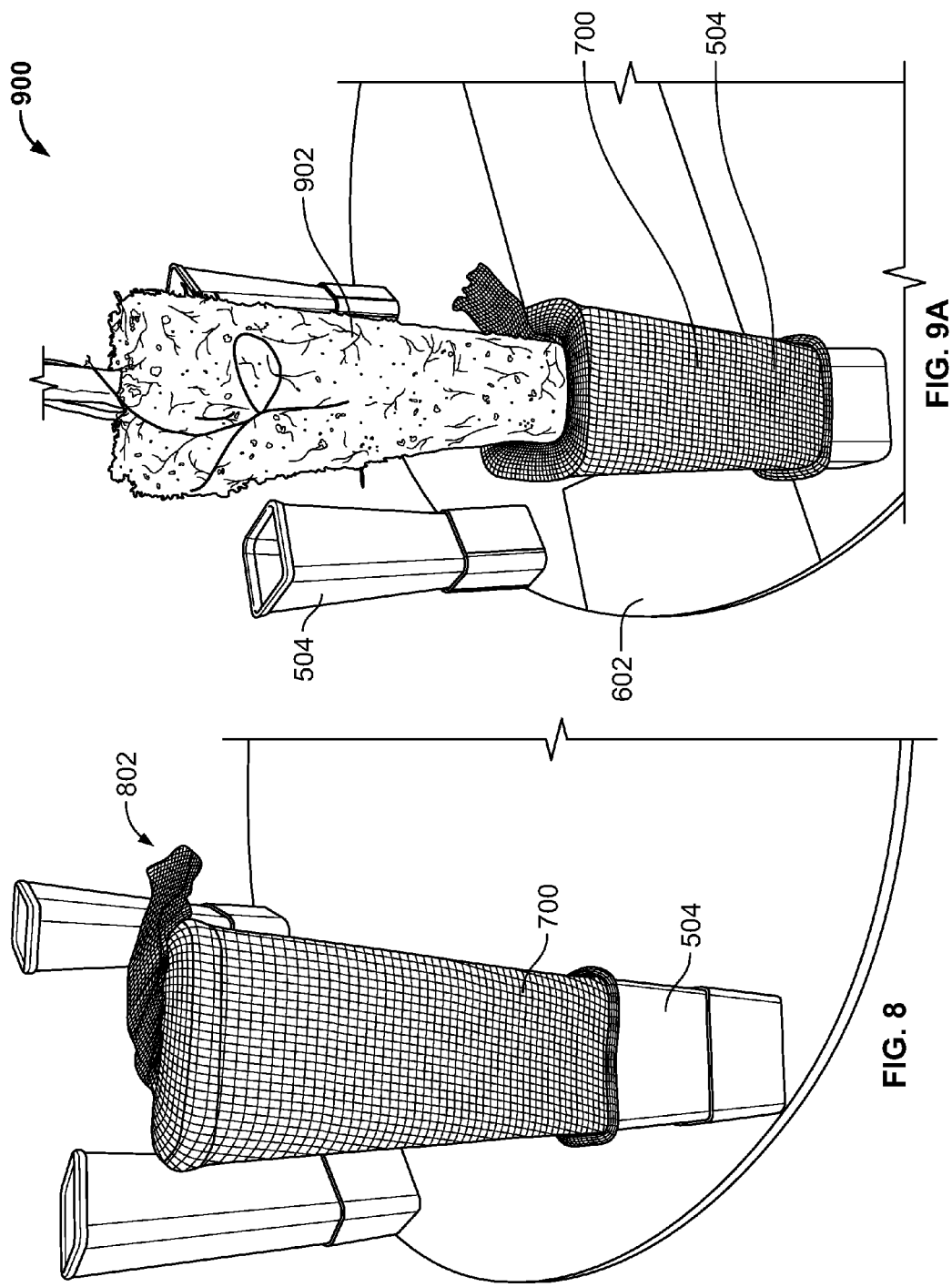

ROOT SOCKING PROCESS AND DISTRIBUTION

BACKGROUND OF THE INVENTION

Field of the Invention

Embodiments of the invention relates to the field of agriculture, and more specifically, to the process of preparing vines and similar plants for transplantation.

Description of the Related Art

Commercial production of vines for distribution involves growing the vines in a controlled environment, e.g. in a greenhouse, using specially designed pots. These pots are generally made of plastic material and are made to be reusable over several plantings. The pots, usually about a dozen or more, fit in a tray that is specially designed for transporting the vines/pot combination. After the normal growing period in the nursery, the vines are ready for transportation to the customer, e.g. wineries and grape growers, for transplanting in the field.

For transportation to the customer, the trays are placed on racks in specially configured trucks. Since the space between racks has to be sufficient to not damage the vines during transportation, each truck can only carry a limited amount of vines.

In the field, farmers have to move the racks around the vast planting area for easy access to the pots during transplanting. In large planting fields, which are typical of most major vineyards, the process becomes too cumbersome because the racks have to be moved along vast distances in fields while transplanting. Also, loose pots are strewn all over the planting field and would have to be picked up for reuse after the transplanting. Because these pots are small, they are sometimes lost in the field thus introducing foreign objects/garbage in the field. Thus, the current transplanting process is very time-consuming and labor-intensive.

To overcome the problems and limitations described above there is a need for a process of preparing and distributing vines and similar plants for efficient transplanting.

BRIEF SUMMARY OF THE INVENTION

One or more embodiments of the invention provide for planting of vines and similar plants by growing each plant in its own plant-growing container, followed by an automated process for preparing the plants for efficient transplanting comprising: covering the root mass of each plant with a sock, preferably biodegradable; filling a cardboard box with multiple root-socked plants; and stacking multiple cardboard boxes in shipping pallets for transportation to the field. The plants are then transplanted in the field by picking up and dropping each root-socked plant from the cardboard box.

In one or more embodiments, each plant is grown in a confined plant-growing container in a greenhouse type (i.e. controlled) environment. Each plant-growing container has a base and one or more side walls extending upwards from the bottom of the base. There are several possible configurations of the plant-growing container. For instance, the base may or may not have holes, and one or more sidewalls may be windowed or non-windowed.

Windowed plant-growing containers are preferably configured to ensure retention of adequate moisture, i.e. proper hydration, during the process of transporting from the greenhouse to the field, i.e. prior to transplantation. Moisture retention can also be accomplished with different soil mixtures, e.g. mixture with more fiber would retain more moisture.

While growing in the controlled environment, the plant typically develops a tap root which grows downwards until reaching the base of the container. For plant-growing containers with no holes at the base, the roots become physically trapped by the container base, causing termination of growth. However, for plant-growing containers with holes at the bottom, the roots are air-pruned when exiting holes in the base of the container.

The plants also develop lateral roots which grow outwardly from the plant towards the sides of the container and generally downwardly due to geotropism. For non-windowed plant-growing containers, the lateral roots move around and down the sides of the container after contacting the sides of the container, a phenomenon known as spiral root growth or "root circling", and together with the tap roots form a root mass or "rootball".

For windowed containers, the lateral roots protrude through the windows but are stunted in growth (i.e. pruned) by air. The resulting root mass or rootball is essentially free of root circling. Air-pruning of the lateral roots offers a simple and effective way to prevent root circling, which may be desirable in some circumstances.

In one or more embodiments, one or more containers are housed in a multi-container tray. In general, a multi-container tray is configured to hold up to several dozen containers in a two-dimensional arrayed grid. The tray is designed to not inhibit the functionality of the plant-growing container. Thus, for instance, for windowed containers, the tray is configured to not obstruct any of the windows thereby maintaining full functionality of the plant-growing containers on or out of the trays.

In one or more embodiments, when the plants are ready for transplantation, usually between 24 to 36 inches in height for vines, they are moved to a root socking assembly. The root socking assembly is preferably a fully automated assembly line which may be configured as a conveyor belt system, a carousel system, etc., with several sections.

In one or more embodiments of the present invention, the root socking assembly comprises a conveyor belt system, wherein the conveyor belt is configured with one or more pots affixed to top surface of the conveyor belt. Each pot is preferable of similar shape and size as the plant-growing container. In a preferred embodiment, the pot is slightly larger than the plant growing container. The pot may be windowed or non-windowed. However, windowing may not be necessary since the plant is only intended to be in the pot for the time it takes to drop the rootball into and out of the pot. The pots may be arranged on the conveyor belt in an arrayed configuration similar to the tray or in any suitable configuration for the desired throughput. For instance, the pots may be arranged serially along the conveyor belt, or in several rows to increase throughput.

In one or more embodiments of the present invention, the root socking assembly comprises a carousel system, the carousel is configured with one or more pots affixed to the top side of the carousel. Each pot is preferable of similar shape and size as the plant-growing container. In a preferred embodiment, the pot is slightly larger than the plant growing container. The pot may be windowed or non-windowed. However, windowing may not be necessary since the plant is only intended to be in the pot for the time it takes to drop the rootball into and out of the pot, e.g. approximately one second. The pots may be arranged on the carousel in any suitable configuration for the desired throughput. For instance, the pots may be arranged serially in one or more rows along the perimeter of the carousel.

In one or more embodiments of the present invention, the root socking assembly may include at least one process driving mechanism configured to move the conveyor belt or carousel system. The process driving mechanism may include motors, gears, pulleys, chains, inclines, chutes, and any other combination of powered and/or mechanical components and/or gravity. The process driving mechanism may further include one or more electronic control components configured to control timing, speed, or any other aspects of the root socking assembly.

In one or more embodiments of the present invention, the root socking assembly further comprises a sock dispensing stage. The sock dispensing stage may include one or more sock dispensers with each dispenser configured to dispense a sock over each pot by placing the sock over the pot as the pot, on the carousel or conveyor belt, passes through the dispensing stage. And based on the material of the sock, the sock preferably stretches over the pot.

In addition, the sock may optionally be dipped into a solution that comprises fertilizer, seaweed, microbes, etc. prior to being placed over the pot; or a fertilizer tablet may be placed into the sock; or combinations thereof, prior to placement over the pot. The solution is preferably dry, or if wet, the sock may be passed through an optional drying stage to allow the sock to dry prior to placement on the pot. In other embodiments, a wet sock may be placed over the pot and either allowed to dry on the pot or used as is in subsequent stages.

In one or more embodiments, the sock is preferably made of a naturally biodegradable material, e.g. cotton, silk, wool, cashmere, and hemp. The sock may also be made of any other material engineered to be biodegradable or compostable.

In one or more embodiments of the present invention, the root socking assembly further comprises a rootball socking stage. In the rootball socking stage, a control mechanism picks up and separates a plant from the plant-growing container and places the rootball of the plant into the pot-sock combination. Upon placement into the pot, the sock compresses on to and surrounds the rootball. The plant, with the sock over the rootball (i.e. the root-socked plant), is subsequently removed from the pot for further processing.

In one or more embodiments of the present invention, the rootball with the sock cover is optionally dipped into a mixture comprising one or more of fertilizer, seaweed, microbes. The mixture may also be sprayed on the rootball-sock combination at this optional stage.

In one or more embodiments of the present invention, the root socking assembly further comprises an optional trimming stage. In the trimming stage, the top of root-socked plant is trimmed so that the height of the root-socked plant, from the bottom of the rootball to the top of the plant, does not exceed a maximum value. Other embodiments may include trimming the plants to a fixed height.

In one or more embodiments of the present invention, the root socking assembly further comprises a packaging stage. In the packaging stage, multiple root-socked plants placed in specially designed shipping box, until the box is full. Each shipping box is preferably capable of holding multiple root socked plants. The shipping box preferably includes several openings on the side walls to provide aeration to the root-socked plants. The shipping box preferably comprises cardboard material, which is a naturally biodegradable material.

In one or more embodiments of the present invention, when the cardboard shipping box is full, it is placed on a shipping pallet. Multiple cardboard shipping boxes may be stacked on each shipping pallet for transportation to the grower's facility. Because the shipping boxes are stackable and on pallets, it is much easier and faster to ship the several thousands of plants required by a typical grower than if the plants were still in the plant-growing containers and in the trays. The pallets may be directly loaded onto the trucks with forklifts and shipped directly to the field for transplanting. Transplanting may be by mechanical means or by manual means by farmers.

In one or more embodiments of the present invention, each root-socked plant may be placed in its own private cardboard container prior to placement into the cardboard shipping box. Placement of the root-socked plant into its own private cardboard container may also facilitate transplanting, especially by mechanical means since each container contains only a single plant and mechanical systems in the field can much easily handle semi-rigid containers than plant stems.

BRIEF DESCRIPTION OF THE DRAWINGS

The above and other aspects, features and advantages of the invention will be more apparent from the following more particular description thereof, presented in conjunction with the following drawings wherein:

FIG. 2 is an illustration of a non-windowed plant-growing container.

FIG. 8 is an illustration of the sock placed over the pot on a carousel in accordance with an embodiment of the present invention.

FIG. 9A is an illustration of the rootball being placed into the pot in accordance with an embodiment of the present invention.

DETAILED DESCRIPTION

A process for root socking and distribution of plants will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

One or more embodiments of the invention provides efficient planting of vines and similar plants by growing each plant in its own plant-growing container, followed by an automated process for preparing the plants for efficient transplanting comprising: covering the root mass of each plant with a sock, preferably biodegradable; filling a cardboard box with multiple root-socked plants; and stacking multiple cardboard boxes in pallets for transportation to the field. The plants are then transplanted in the field by picking up and dropping each root-socked plant from the cardboard box.

Figure 1:
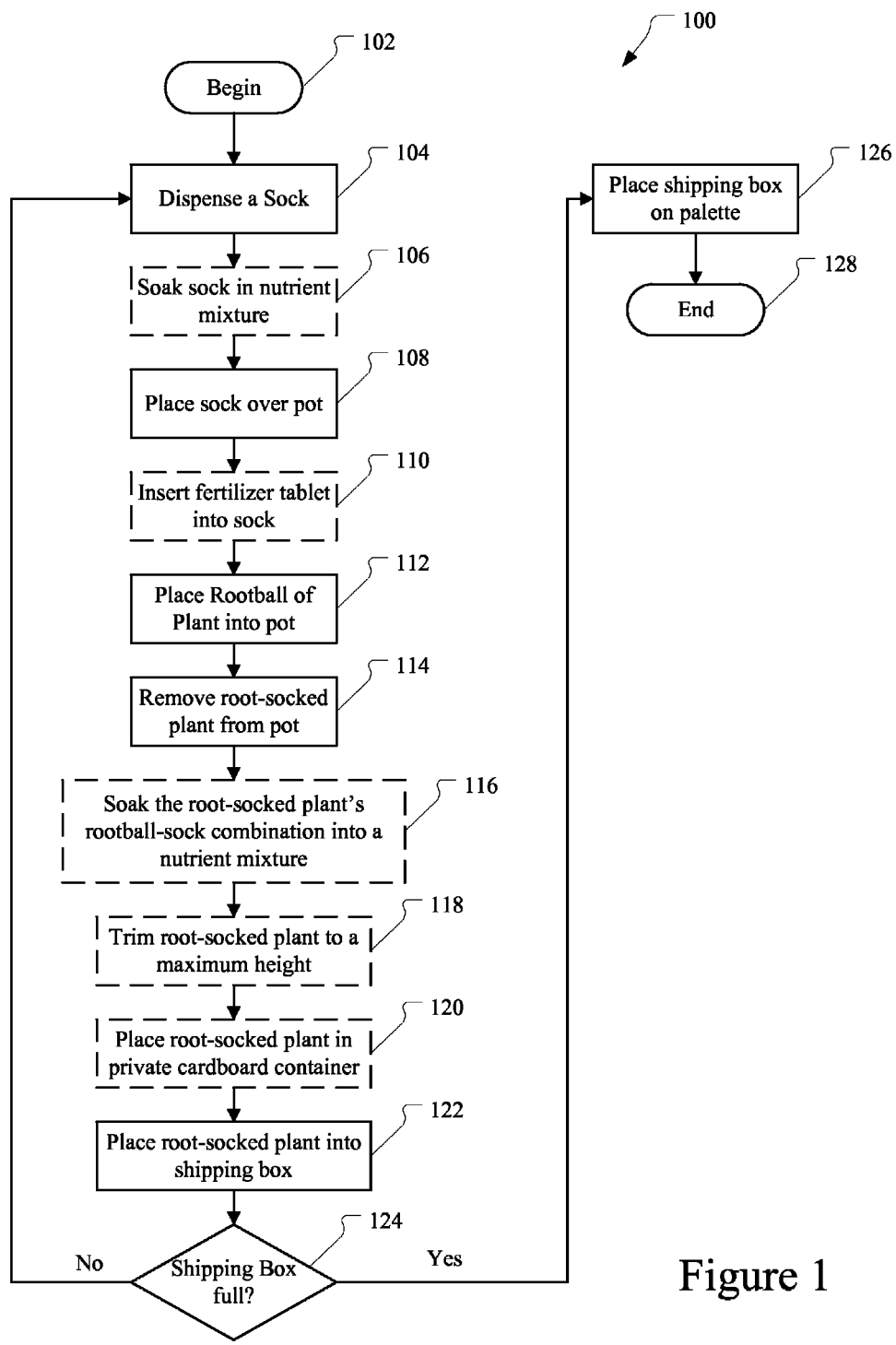
FIG. 1 is an illustration of an exemplary root-socking process flow for preparation of plants for transplanting in accordance with one or more embodiments of the present invention.

FIG. 1 is an illustration of an exemplary root-socking process flow for preparation of plants for transplanting in accordance with one or more embodiments of the present invention. In this illustration of process 100, it is assumed that each plant has been grown in its own plant-growing container and is in a state where it is ready for transplantation. The socking process begins at step 102. At step 104, a sock is dispensed from its container. Note that each sock container may contain one or more socks. The sock is optionally soaked in a nutrient mixture at step 106. The nutrient mixture may comprise fertilizer, seaweed and other microbes.

In step 108, the sock is placed over a pot such as to essentially cover the pot. Placement of the sock over the pot essentially results in stretching of the sock over the pot. The pot is preferably on a conveyor belt or a carousel type system. In one or more embodiments, a fertilizer tablet is optionally inserted into the sock at step 110.

In step 112, the rootball of the plant is placed into the pot where the sock transfers from the pot to the rootball and clings to the rootball to form a root-socked plant. The root-socked plant is subsequently removed from the pot in step 114. When the rootball is removed from the pot, the sock is now affixed to the rootball and, preferably, completely surrounds the rootball.

In step 116, the rootball-sock combination may optionally be soaked in a nutrient mixture. The nutrient mixture may comprise fertilizer, seaweed and other microbes, for instance. From the above description, it would be apparent to those of skill in the art that the nutrient addition to the sock may occur prior to placement of the sock over the pot, at the pot, after the sock is placed over the rootball, or combinations thereof. The type, composition, and quantity of nutrient may depend on the grower's preference, the composition of the soil in the field, and other factors.

In one or more embodiments, the root-socked plant is optionally trimmed to a maximum height in preparation for shipping, in step 118, and optionally placed in a private cardboard container in step 120.

In step 122, the root-socked plant is placed in a shipping box. And if the shipping box is not full, as determined in step 124, more plants are processed and prepared for shipping by returning to step 104. However, if the shipping box is full, the process continues to step 126 where the shipping box is placed on a shipping pallet. The entire process 100 continues until all the plants are processed and placed in shipping boxes and the boxes are on the pallet. At this point, the plants are ready for shipping to the grower's facility and the preparation process 100 terminates in step 128.

A detailed description of each process step, hardware and system will now follow with references to FIGS. 2 through 14.

Figure 3:
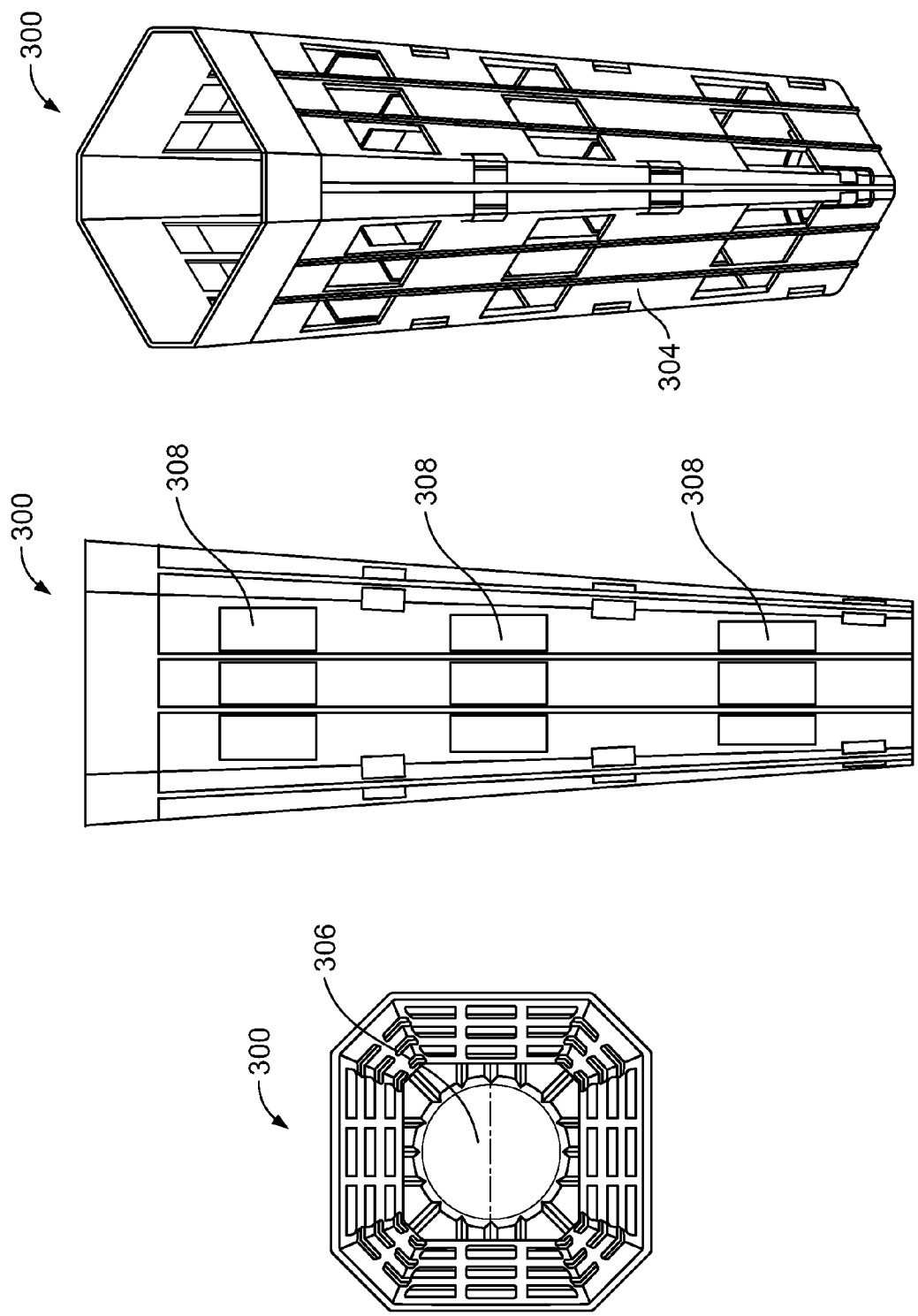
FIG. 3 is an illustration of different views of a windowed plant-growing container.

In one or more embodiments, each plant is grown in a confined plant-growing container in a greenhouse type (i.e. controlled) environment. FIGS. 2 and 3 are illustrations of different views of plant-growing containers 200 and 300. FIG. 2 presents illustrations of a front perspective view and a bottom perspective view of a non-windowed plant-growing container 200. As illustrated, each plant-growing container, e.g. 200, has a base 202 and one or more side walls 204 extending upwards from the bottom of the base 202. A plant-growing container may take several possible configurations. For instance, the base may or may not have one or more holes, e.g. 206, and the one or more sidewalls may be windowed 304 or non-windowed 204.

FIG. 3 presents illustrations of a front perspective view, a side view and a top view of a windowed plant-growing container 300. Windowed plant-growing containers are preferably designed to provide adequate air-pruning and to ensure retention of adequate moisture, i.e. proper hydration, during the process of transporting from the greenhouse to the field, i.e. prior to transplantation. Moisture retention can also be accomplished with different soil mixtures. For instance, a soil mixture with more fiber would retain more moisture.

While growing in a controlled environment, the plant typically develops a tap root which grows downwards until reaching the base of the container. For plant-growing containers with no holes at the base, the roots become physically trapped by the container base, causing termination of growth. However, for plant-growing containers with holes at the bottom, e.g. 206 and 306, the roots are air-pruned when exiting holes, e.g. 206 and 306, in the base of the container.

The plants also develop lateral roots which grow outwardly from the plant towards the sides of the container and generally downwardly due to geotropism. For non-windowed plant-growing containers, e.g. 200, the lateral roots move around and down the sides of the container after contacting the sides of the container, a phenomenon known as spiral root growth or "root circling", and together with the tap roots form a root mass or rootball.

For windowed containers, e.g. 300, the lateral roots protrude through the windows, e.g. 308, but are stunted in growth (i.e. pruned) by air. The resulting root mass or rootball is essentially free of root circling. Air-pruning of the lateral roots offers a simple and effective way to prevent root circling, which may be desirable in some circumstances.

Figure 4:
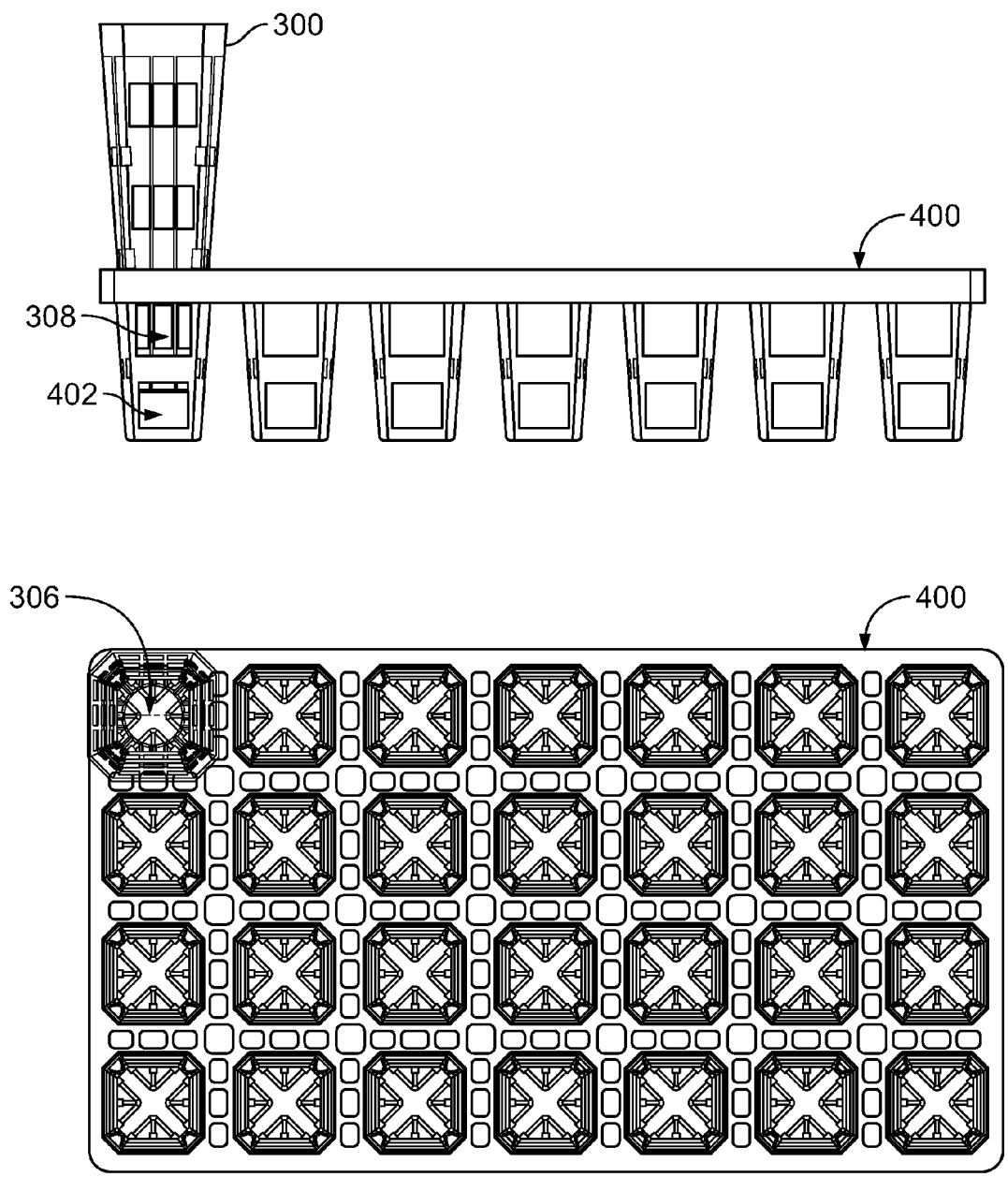
FIG. 4 presents different views of a multi-container tray for one or more plant-growing containers.

In one or more embodiments, one or more containers are housed in a multi-container tray. FIG. 4 presents a side view and a top view of a multi-container tray 400 for plant-growing container 300. In general, a multi-container tray 400 is configured to hold up to several dozen plant-growing containers in a two-dimensional arrayed grid. The tray, e.g. 400, is designed to not inhibit the functionality of the plant-growing container, e.g. 300. Thus, for instance, for windowed containers, the tray is configured to not obstruct any of the windows, e.g. 308, or base holes, e.g. 306, thereby maintaining full functionality of the plant-growing containers on or out of the trays. Tray 400 is also designed to provide clearance, e.g. 402, between the bottom of plant-growing container and the ground.

In one or more embodiments, when the plants are ready for transplantation, usually between 24 to 36 inches in height for vines, they are moved to a root socking assembly. The root socking assembly may be operated manually, semi-automated or fully automated. The root socking assembly is preferably a fully automated assembly line which may be configured as a conveyor belt system, or a carousel system. It would be apparent to those of skill in the art that any other assembly line type system may be adopted without deviating from the spirit of the invention.

Figure 5A:
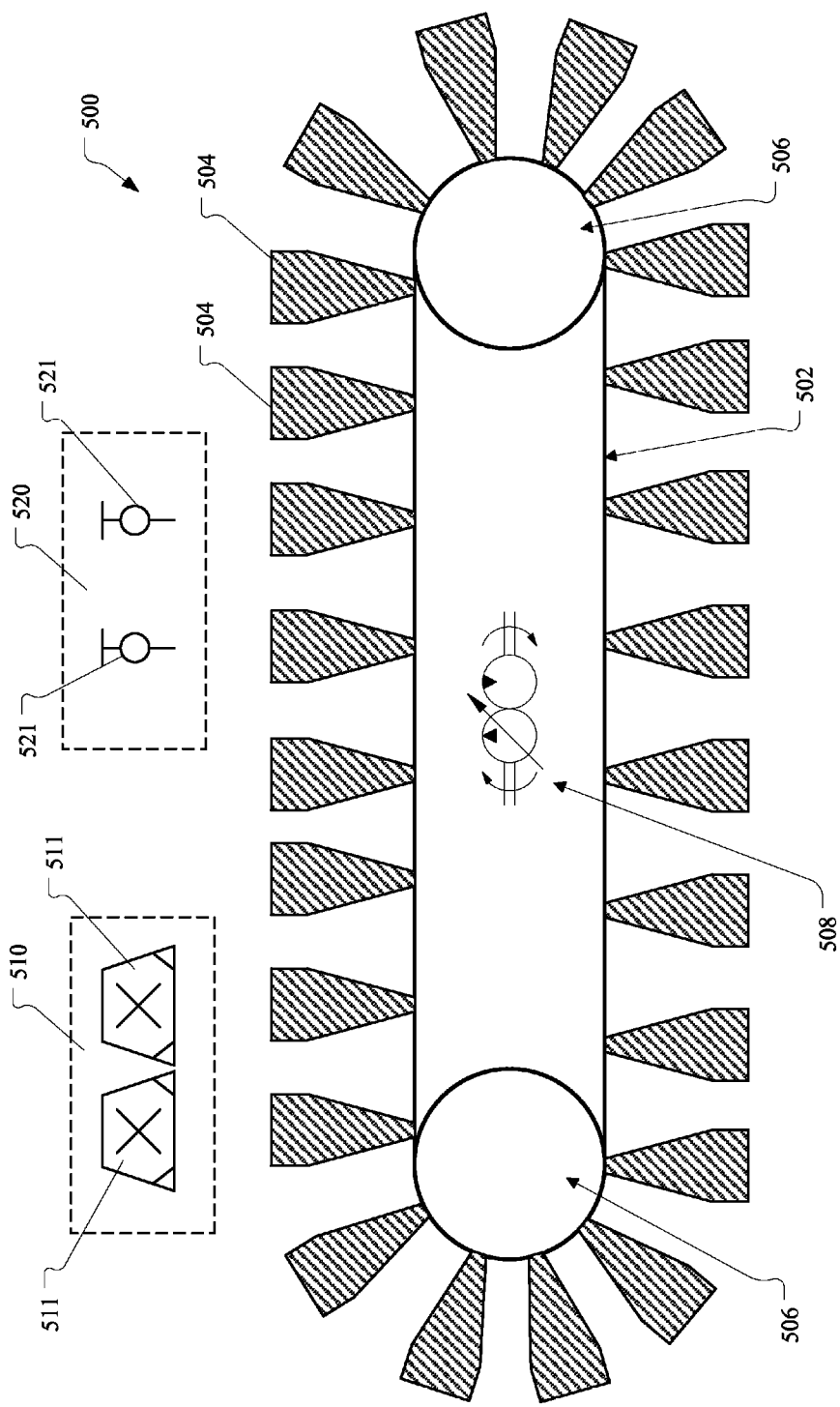
FIG. 5A is an illustration of a conveyor belt system in accordance with one or more embodiments of the present invention.
Figure 5B:
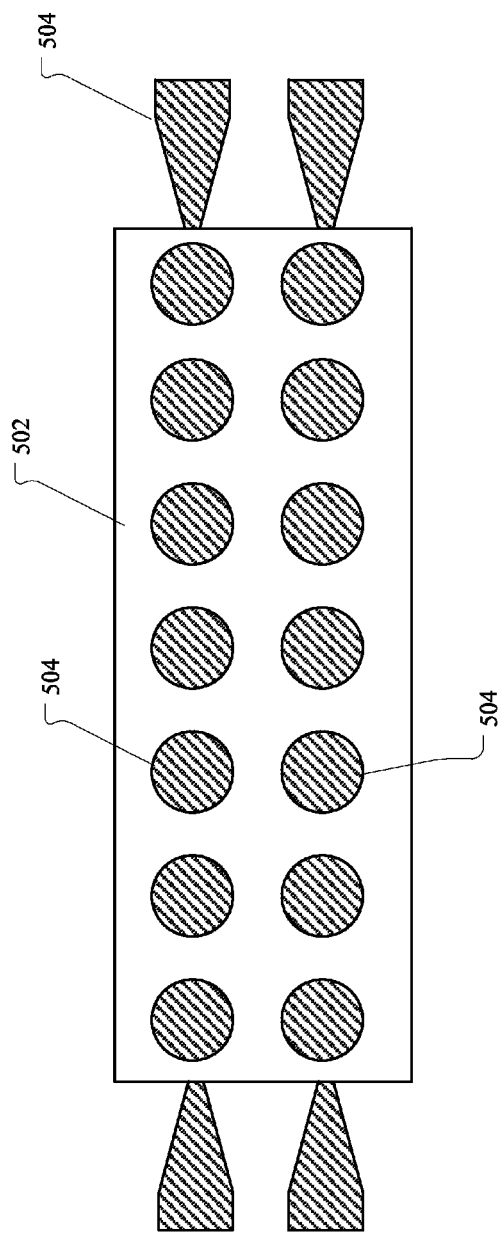
FIG. 5B is a top view of the conveyor belt 502 in accordance with one or more embodiments of the present invention.

In one or more embodiments of the present invention, the root socking assembly comprises a conveyor belt system. FIG. 5A is an illustration of a conveyor belt system in accordance with one or more embodiments of the present invention and FIG. 5B is a top view of the conveyor belt 502 in accordance with one or more embodiments of the present invention. As illustrated, system 500 comprises a conveyor belt 502 which is configured with one or more pots, e.g. 504, affixed to top surface of the conveyor belt. Each pot is preferable of similar shape and size as the plant-growing container, e.g. 200 or 300. In a preferred embodiment, pot 504 is slightly larger than the plant growing container, e.g. 200 and 300. The pot may be windowed or non-windowed. However, windowing may not be necessary since the plant is only intended to be in the pot for the time it takes to drop a rootball into and out of the pot. The pots may be arranged on the conveyor belt in an arrayed configuration similar to the tray or in any suitable configuration for the desired throughput. For instance, the pots may be arranged serially along the conveyor belt, or in more than one row to increase throughput, as illustrated in FIG. 5B.

Figure 6:
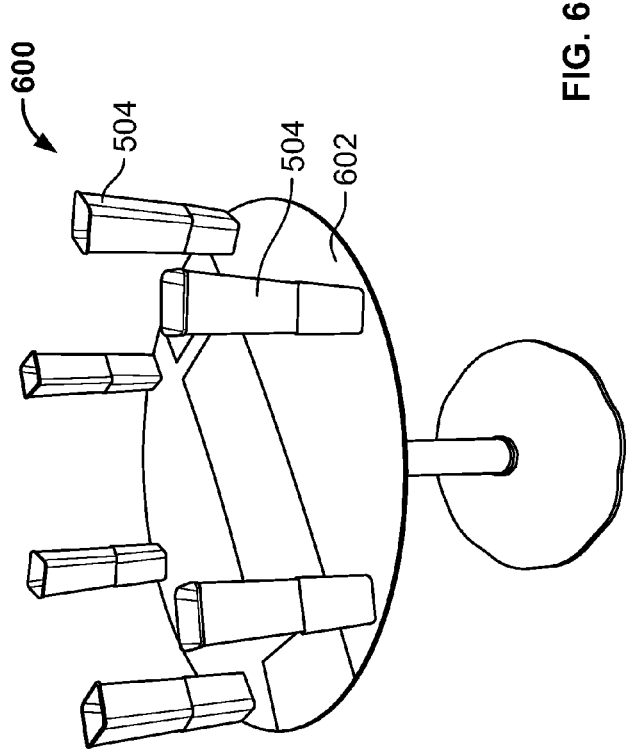
FIG. 6 is an illustration of a carousel system in accordance with one or more embodiments of the present invention.

In one or more embodiments of the present invention, the root socking assembly comprises a carousel system. FIG. 6 is an illustration of a carousel system in accordance with one or more embodiments of the present invention. As illustrated, carousel 600 is configured with one or more pots, e.g. 504, affixed to the top side of the carousel. Each pot is preferable of similar shape and size as the plant-growing container. In a preferred embodiment, the pot is slightly larger than the plant growing container. The pot may be windowed or non-windowed. However, windowing may not be necessary since the plant is only intended to be in the pot for the time it takes to drop the rootball into and out of the pot, e.g. approximately one second. The pots may be arranged on the carousel platform 602 in any suitable configuration for the desired throughput. For instance, the pots may be arranged serially in one or more rows along the perimeter of the carousel platform 602, as illustrated.

In one or more embodiments of the present invention, the root socking assembly may include at least one process driving mechanism, e.g. 508, configured to move the conveyor belt system 500 or carousel system 600. The process driving mechanism may include motors, gears, pulleys, chains, inclines, chutes, and any other combination of powered and/or mechanical components and/or gravity. The process driving mechanism may further include one or more electronic control components, e.g. computer system, configured to control timing, speed, or any other aspects of the root socking assembly.

In one or more embodiments of the present invention, the root socking assembly further comprises a sock dispensing stage 510. The sock dispensing stage may include one or more sock dispensers, e.g. 511, with each dispenser configured to dispense a sock, e.g. 700, over each pot, e.g. 504, by placing the sock over the pot as the pot 504, on the carousel (as illustrated in FIG. 8) or conveyor belt, passes through the dispensing stage 510. And based on the material of the sock, the sock 700 preferably stretches over the pot 504.

Figure 7:
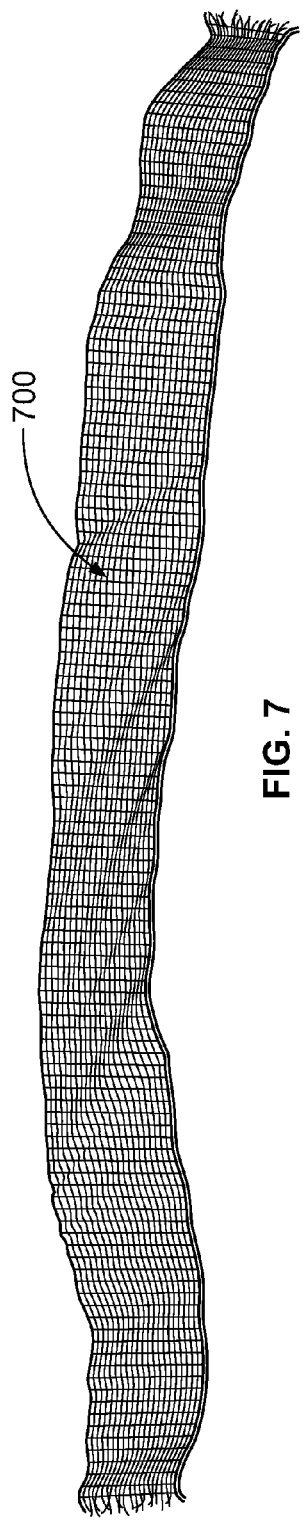
FIG. 7 is an illustration of a sock in accordance with an embodiment of the present invention.

FIG. 7 is an illustration of a sock in accordance with an embodiment of the present invention. In one or more embodiments, the sock is preferably made of a naturally biodegradable material, e.g. cotton, silk, wool, cashmere, hemp, and combinations thereof. The sock may also be made of any other material engineered to be biodegradable or compostable. One or more configuration of the sock may comprise a closed or partially closed end 802. Thus, when the sock is placed over the pot, the closed or partially closed end 802 is at the top of the pot, as illustrated in FIG. 8.

In addition, the sock may optionally be dipped into a nutrient mixture that comprises fertilizer, seaweed, microbes, etc. prior to being placed over the pot; or a fertilizer tablet may be placed into the sock; or combinations thereof, prior to placement over the pot. Fertilizer commonly known in the art as "triple 15" may be used. Triple 15 (15-15-15) refers to the rating of the fertilizer, i.e. N—P—K (i.e. Nitrogen, Phosphorous, and Potassium) ratios. The actual rating of the fertilizer and content of other nutrients used may depend on the grower and other conditions.

The mixture is preferably dry, or if wet, the sock may be passed through an optional drying stage to allow the sock to dry prior to placement on the pot. In other embodiments, a wet sock may be placed over the pot and either allowed to dry on the pot or used as is in subsequent stages.

Figure 10:
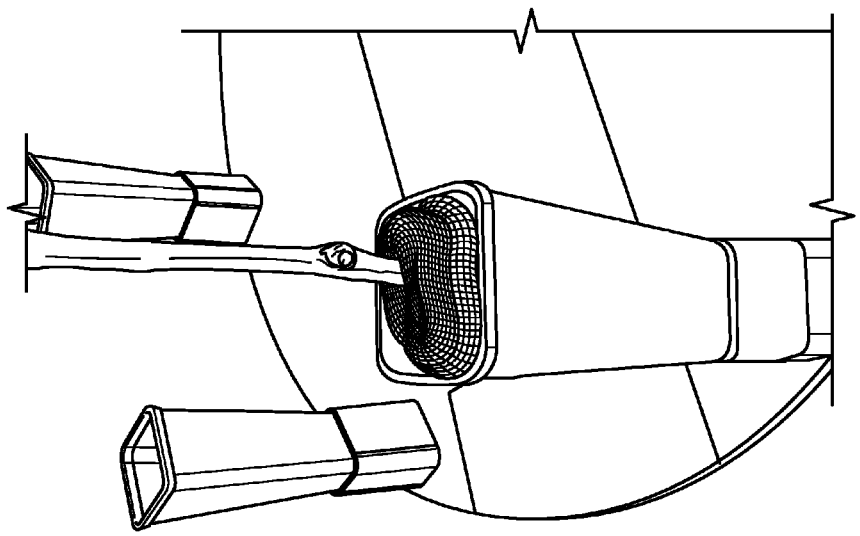
FIG. 10 is an illustration of the sock over the rootball while still in the pot in accordance with an embodiment of the present invention.
Figure 9B:
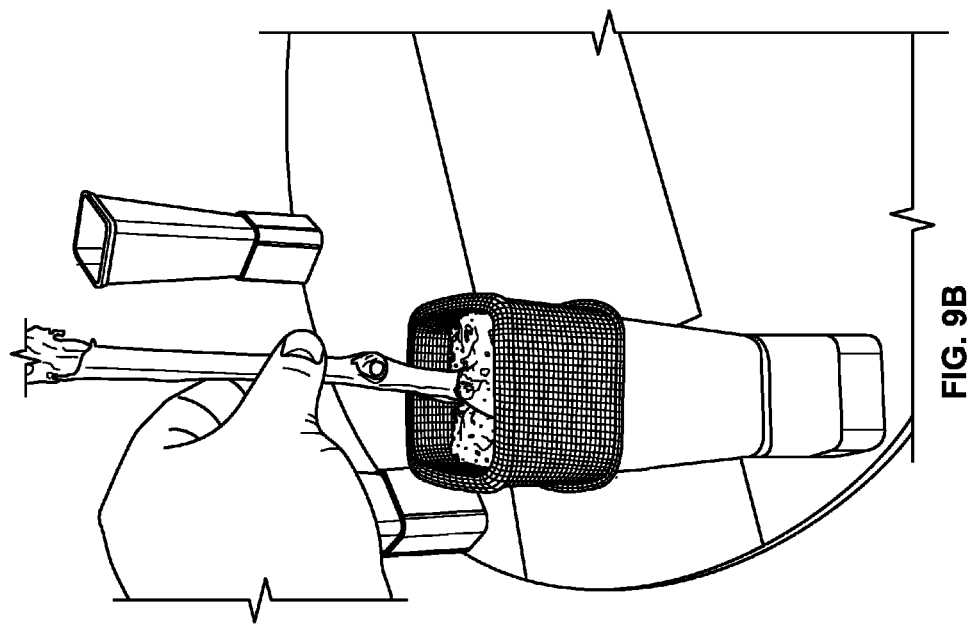
FIG. 9B is an illustration of the rootball completely in the pot in accordance with an embodiment of the present invention.

In one or more embodiments of the present invention, the root socking assembly further comprises a rootball socking stage 520. In the rootball socking stage, one or more control mechanisms or arms, e.g. 521, picks up and separates a plant from the plant-growing container and places the rootball 902 of the plant into the pot-sock combination 504 and 700, as illustrated in FIGS. 9A and 9B. Upon placement into the pot, the sock compresses onto and surrounds the rootball, as illustrated in FIG. 10. It should be noted that the plant-growing containers are generally transported to the assembly line in trays, e.g. 400. Thus, several plants are processed in rapid fashion.

Figure 11:
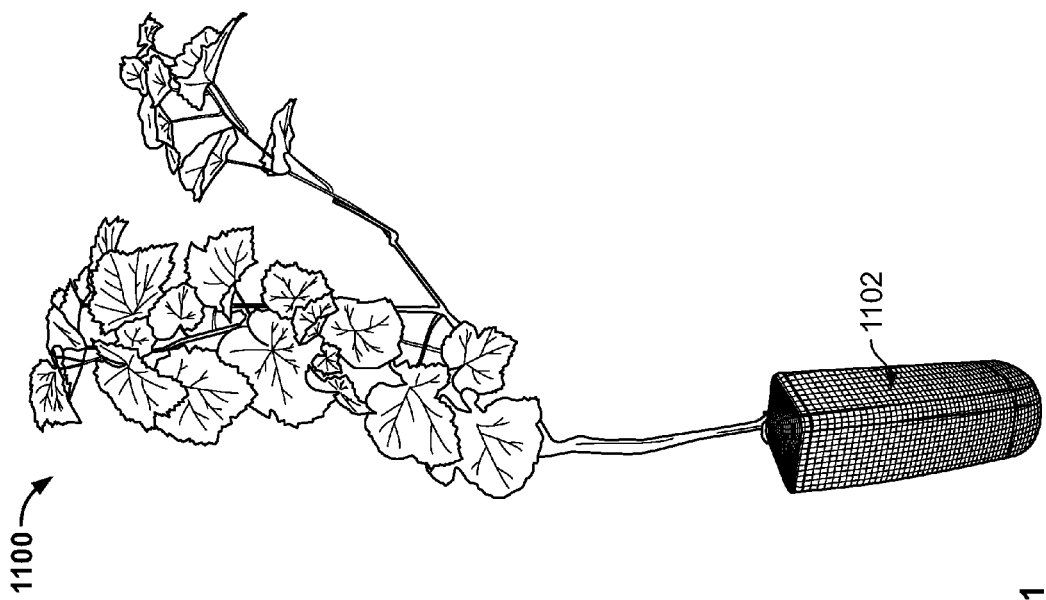
FIG. 11 is an illustration of the root-socked plant in accordance with an embodiment of the present invention.

The plant, with the sock over the rootball (i.e. the root-socked plant 1100), is subsequently removed from the pot for further processing. The root-socked plant 1100 is illustrated in FIG. 11.

In one or more embodiments of the present invention, the rootball with the sock cover, e.g. 1102, is optionally dipped into a mixture comprising one or more of fertilizer, seaweed, and/or other microbes. The mixture may also be sprayed on the rootball-sock combination 1102 at this optional stage.

In one or more embodiments of the present invention, the root socking assembly further comprises an optional trimming stage. In the trimming stage, the top of root-socked plant 1100 is trimmed so that the height of the root-socked plant, from the bottom of the rootball to the top of the plant, does not exceed a maximum height. Other embodiments may include trimming the root-socked plant 1100 to a fixed height. The height or maximum height may depend on the height of the shipping box, e.g. 1300.

Figure 12A:
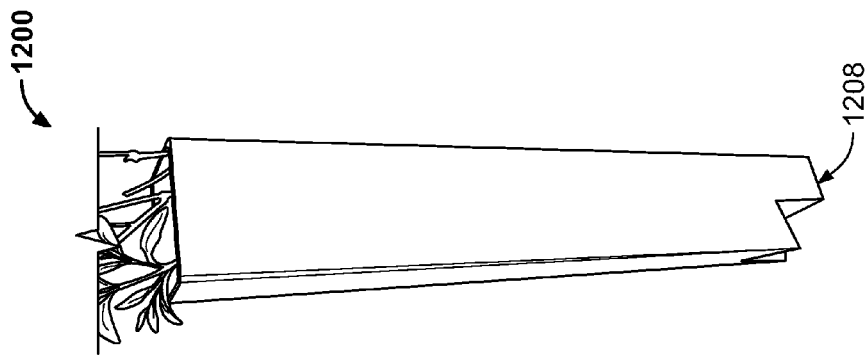
FIGS. 12A-C are illustrations of a bottom perspective view, a side perspective view and a bottom view of a private cardboard cover in accordance with an embodiment of the present invention.
Figure 12C:
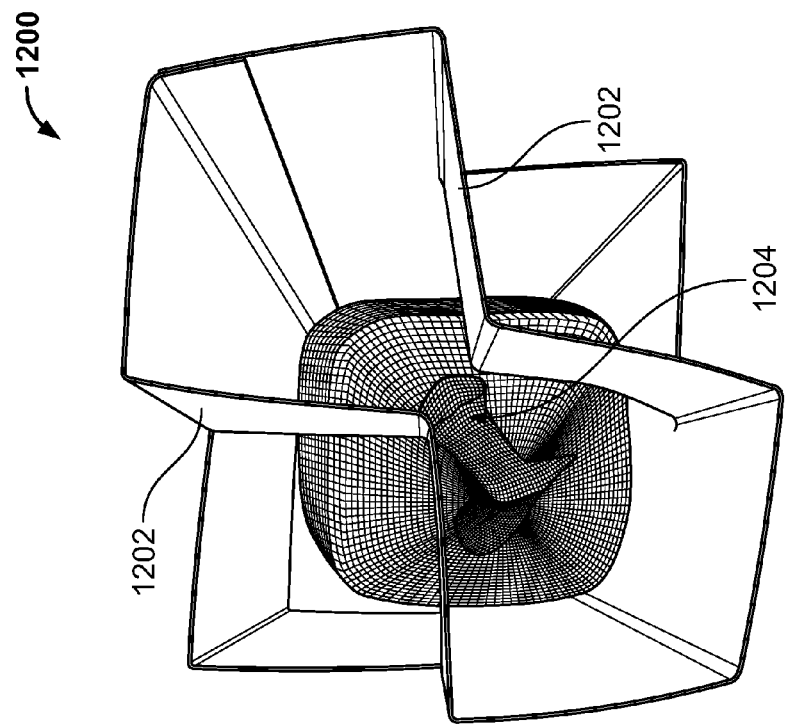
Figure 12B:
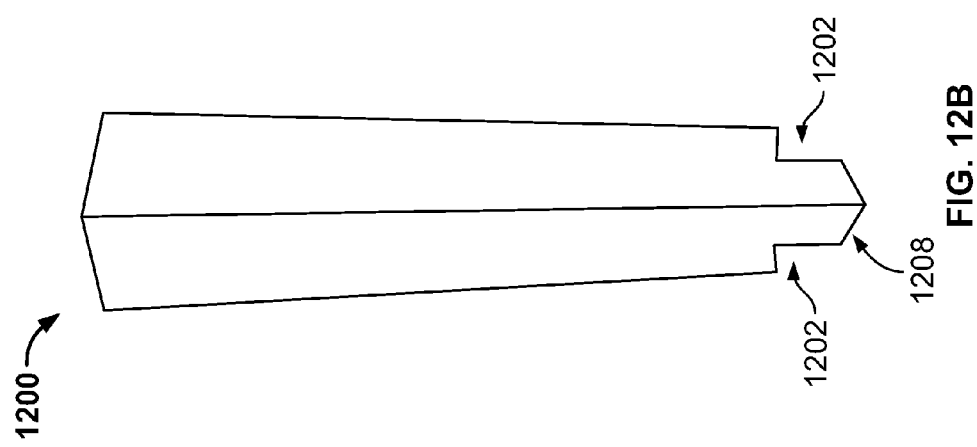
Figure 13B:
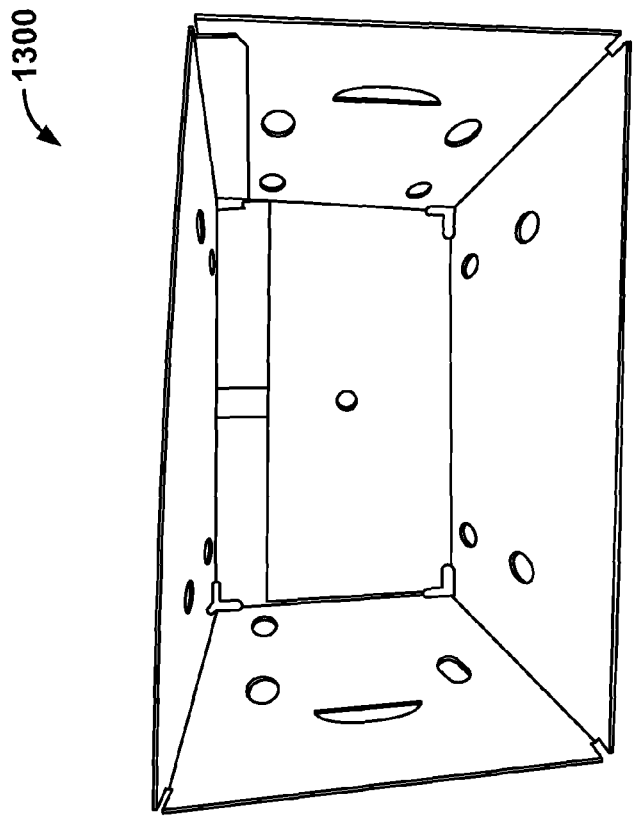
FIG. 13B is a top view of the shipping box in accordance with one or more embodiments of the present invention.
Figure 13A:
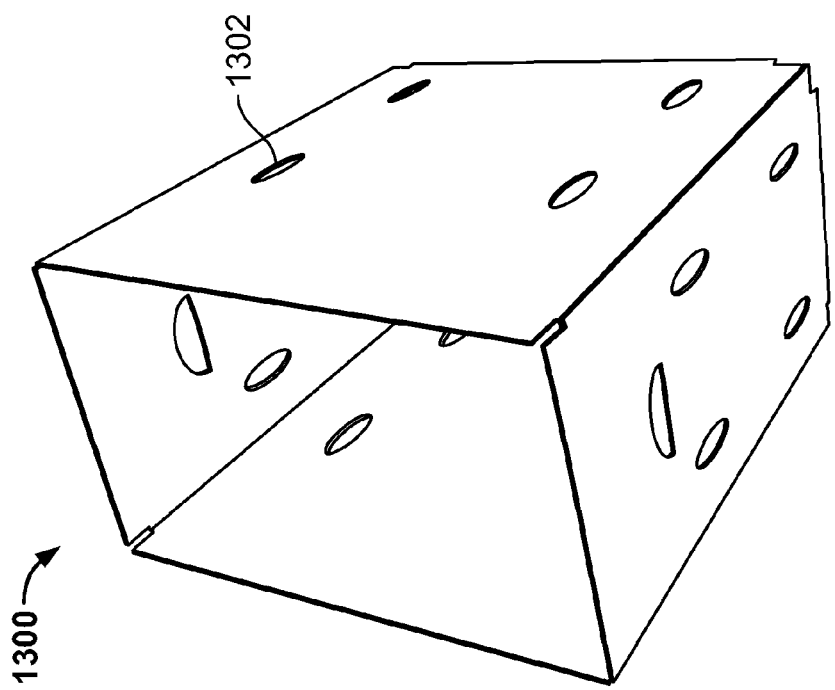
FIG. 13A is a top perspective view of a shipping box in accordance with one or more embodiments of the present invention.
Figure 14:
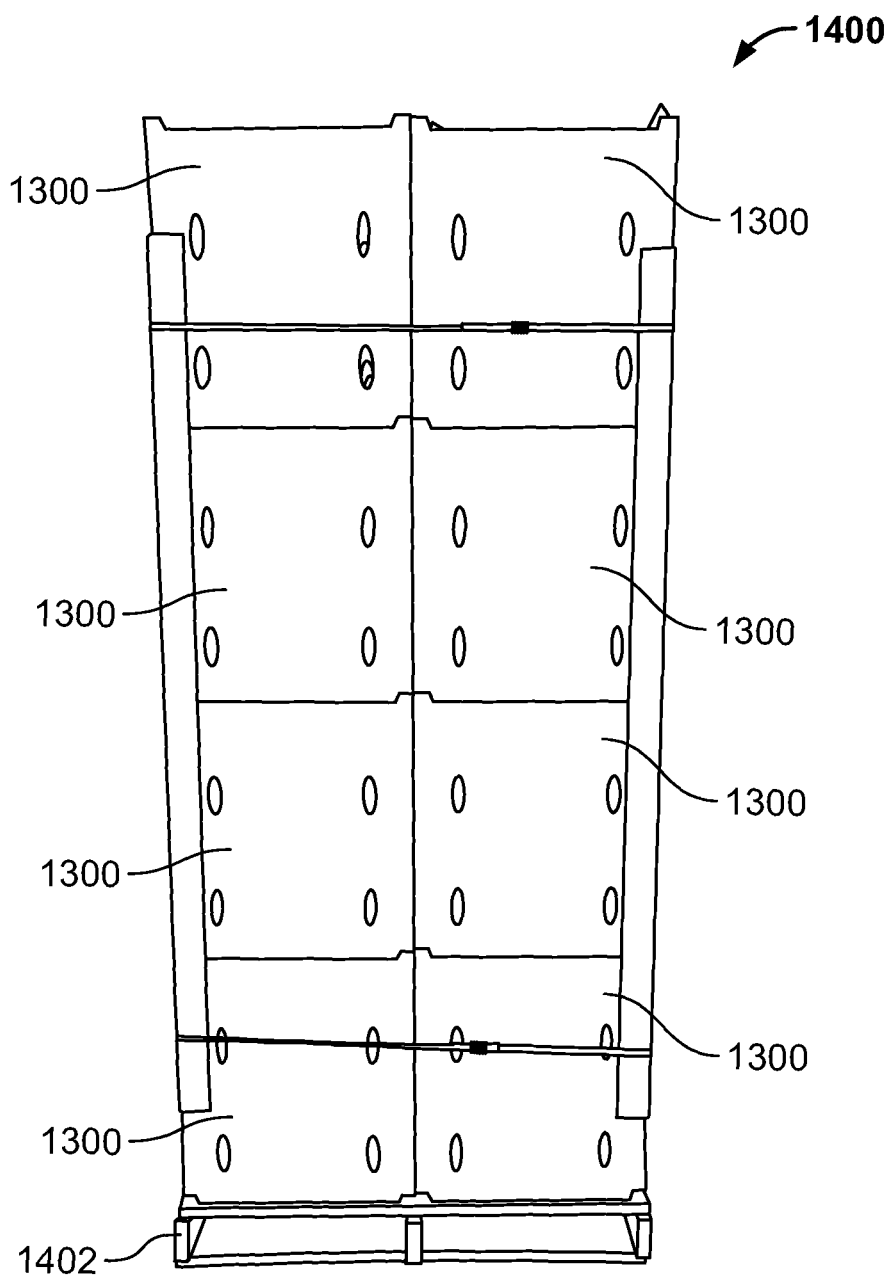
FIG. 14 is an illustration of the shipping boxes on a pallet in accordance with an embodiment of the present invention.

In one or more embodiments of the present invention, the root socking assembly further comprises a packaging stage. In the packaging stage, each root-socked plant may optionally be placed in its own private cardboard container/cover, e.g. 1200, prior to placement into the cardboard shipping box. Placement of the root-socked plant into its own private cardboard cover 1200 may also facilitate transplanting, especially by mechanical means since each container contains only a single plant and mechanical systems in the field can much easily handle fixed-size semi-rigid containers than plant stems with varying configurations and dimensions. FIGS. 12A-C are illustrations of a bottom perspective view, a side perspective view and a bottom view of a private cardboard cover in accordance with an embodiment of the present invention.

In the disclosed embodiment of cover 1200, the bottom of the root-socked plant rests on the barrier 1204 formed by the two punched-in diagonal flaps 1202. Thus, for transplanting, the bottom section 1208 is placed on or in close proximity to the ground and above the planting hole, the diagonal flaps 1202 are pulled out thus releasing the rootball of the root-socked plant into the planting hole.

In the packaging stage, multiple root-socked plants 1100 are placed in a specially designed shipping box, e.g. 1300, until the box is full. Each shipping box 1300 is preferably capable of holding multiple root socked plants. The shipping box preferably includes several openings on the side walls, e.g. 1302, to provide aeration for the root-socked plants 1100. The shipping box preferably comprises cardboard material, which is a naturally biodegradable material.

In one or more embodiments of the present invention, when a cardboard shipping box 1300 is full, it is placed on a shipping pallet, e.g. 1402. Multiple cardboard shipping boxes 1300 may be stacked on each shipping pallet for transportation to the grower's facility. Because the shipping boxes are stackable and on pallets, it is much easier and faster to ship the several thousands of plants required by a typical grower than if the plants were still in the plant-growing containers and in the trays. The pallets may be directly loaded onto the trucks with forklifts and shipped directly to the field for transplanting. Transplanting may be by mechanical means or by manual means by farmers.

While the invention herein disclosed has been described by means of specific embodiments and applications thereof, numerous modifications and variations could be made thereto by those skilled in the art without departing from the scope of the invention set forth in the claims.

What is claimed is:

1. A root socking and distribution method comprising:
   slipping a sock over a pot such that a portion of the sock remains unengaged outside of the pot, wherein said sock comprises a stretchable material that is open at both ends, and said slipping over said pot comprises stretching a first one of said open ends of said sock over said pot, and said unengaged portion comprises a second one of said open ends;
   inserting a rootball of a plant into said pot, thereby causing the portion of the sock outside the pot to cover the rootball, and causing said sock to transfer from said pot and automatically cling onto the rootball to form a root-socked plant;
   removing said root-socked plant from said pot; and
   placing said root-socked plant into a shipping box, wherein said shipping box is capable of holding a plurality of root-socked plants.

2. The root socking and distribution method of claim 1, further comprising treating said sock in a mixture of nutrients selected from the group consisting of fertilizer, seaweed, microbes, and combinations thereof.

3. The root socking and distribution method of claim 1, further comprising inserting a fertilizer tablet into said sock.

4. The root socking and distribution method of claim 1, wherein the sock is made of a naturally biodegradable material selected from the group consisting of cotton, silk, wool, cashmere, hemp and combinations thereof.

5. The root socking and distribution method of claim 1, wherein the shipping box is made of cardboard material.

6. The root socking and distribution method of claim 1, further comprising placing additional root-socked plants into the shipping box until the shipping box is full.

7. The root socking and distribution method of claim 6, wherein said shipping box is stackable, and wherein said full shipping box is placed on a pallet.

8. A root socking and distribution method comprising:
   slipping a sock over a pot such that a portion of the sock remains unengaged outside of the pot, wherein said sock comprises a stretchable material that is open at both ends, and said slipping over said pot comprises stretching a first one of said open ends of said sock over said pot, and said unengaged portion comprises a second one of said open ends;
   inserting a rootball of a plant into said pot, thereby cauisng the portion of the sock outside the pot to cover the rootball, wherein said sock automatically clings onto and surrounds the rootball to form a root-socked plant;
   removing said root-socked plant from said pot;
   trimming said root-socked plant to a maximum height; and
   placing said trimmed root-socked plant into a shipping box, wherein said shipping box is capable of holding a plurality of root-socked plants.

9. The root socking and distribution method of claim 8, further comprising treating said sock in a mixture of nutrients selected from the group consisting of fertilizer, seaweed, microbes, and combinations thereof.

10. The root socking and distribution method of claim 8, further comprising inserting a fertilizer tablet into said sock.

11. The root socking and distribution method of claim 8, wherein the sock is made of a naturally biodegradable material selected from the group consisting of cotton, silk, wool, cashmere, hemp and combinations thereof.

12. The root socking and distribution method of claim 8, further comprising placing additional root-socked plants into the shipping box until the shipping box is full.

13. The root socking and distribution method of claim 12, wherein said shipping box is stackable, and wherein said full shipping box is placed on a pallet.

14. The root socking and distribution method of claim 8, wherein the shipping box is made of cardboard material.

15. A root socking and distribution method comprising:
a sock dispenser dispensing a sock, wherein said sock comprises a stretchable material that is open at both ends;
soaking said sock in a nutrient mixture;
stretching a first end of said nutrient soaked sock over a pot such that a portion of the sock that remains unengaged outside of the pot comprises a second one of said open ends, wherein said pot is one of a plurality of pots on a carousel or conveyor system;
inserting a rootball of a plant into said pot, thereby causing the portion of the sock outside the pot to cover the rootball, wherein said nutrient soaked sock automatically clings onto and surrounds the rootball to form a root-socked plant;
removing said root-socked plant from said pot;
trimming said root-socked plant to a maximum height; and
placing said trimmed root-socked plant into a shipping box, wherein said shipping box is capable of holding a plurality of root-socked plants.

16. The root socking and distribution method of claim 15, wherein said nutrient mixture is selected from the group consisting of fertilizer, seaweed, microbes, and combinations thereof.

17. The root socking and distribution method of claim 15, further comprising inserting a fertilizer tablet into said sock.

18. The root socking and distribution method of claim 15, wherein the sock is made of a naturally biodegradable material selected from the group consisting of cotton, silk, wool, cashmere, hemp and combinations thereof.

19. The root socking and distribution method of claim 15, wherein the shipping box is made of cardboard material.

20. The root socking and distribution method of claim 15, further comprising placing additional root-socked plants into the shipping box until the shipping box is full.

\* \* \* \* \*